(12) United States Patent
Slatter et al.

(10) Patent No.: US 6,567,126 B1
(45) Date of Patent: May 20, 2003

(54) PLANAR FOCUS CORRECTION

(75) Inventors: David Neil Slatter, Bristol (GB); Malcolm David McKinnon Roe, Clevedon (GB)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/346,201

(22) Filed: Jul. 1, 1999

(30) Foreign Application Priority Data

Jul. 8, 1998 (EP) .............................. 98305434

(51) Int. Cl.[7] .................. G03B 13/00; H04N 5/232
(52) U.S. Cl. ......................... 348/345; 348/351
(58) Field of Search ................ 348/345, 351, 348/207.99, 219.1, 349, 346; 250/207.1, 208.1

(56) References Cited

U.S. PATENT DOCUMENTS

| | | | |
|---|---|---|---|
| 4,564,277 A | | 1/1986 | Koch et al. |
| 5,302,983 A | | 4/1994 | Sato et al. |
| 5,432,331 A | * | 7/1995 | Wertheimer ............... 348/349 |
| 5,453,784 A | * | 9/1995 | Krishnan et al. ........... 348/351 |
| 6,023,056 A | * | 2/2000 | Fiete et al. ................ 348/349 |
| 6,072,529 A | * | 6/2000 | Mutze ....................... 348/351 |

FOREIGN PATENT DOCUMENTS

| | | |
|---|---|---|
| DE | 196 37 629 A | 3/1998 |
| EP | 0 984 319 A1 * | 8/2000 |

* cited by examiner

Primary Examiner—Aung S. Moe (57) ABSTRACT

The present invention relates to the correction of planar focus in an electronic still or video camera. The camera includes: a detector array an objective lens arranged to direct optical radiation from an object plane onto the detector the lens defining an optical axis of the camera and the object plane being at an oblique angle to the optical axis movement device to change the relative orientation of the detector with respect to the lens so that the detector and lens may be moved relatively toward or away from each other along the optical axis and also tilted with respect to each other with at least one degree of freedom and focus detection device connected to the detector to detect when a portion of an image falling on the detector is in focus. The camera also includes a processor device to control the movement device according to the detected focus, the processor device bringing the image into focus on the detector by first changing the relative orientation of the lens and detector until a first portion of the image is in focus, and then holding said first portion in focus whilst continuing to change the relative orientation of the lens and detector until a second portion of the image is also in focus.

16 Claims, 3 Drawing Sheets

PLANAR FOCUS CORRECTION

TECHNICAL FIELD

The present invention relates to the correction of planar focus in an electronic still or video camera.

BACKGROUND OF THE INVENTION

Desktop flat bed scanners are very common in office imaging applications. Although these are relatively inexpensive and work well, a disadvantage is that these invariably take up a significant amount of desk space, which is always at a premium.

Digital camera products are becoming common in many areas of still and motion photography, and as a result are becoming ever less expensive. However such cameras are still used almost exclusively for photography of people or places, and have yet to be adapted for use in office imaging applications. This is because electronic cameras, which normally employ two dimensional CCD arrays, have insufficient resolution to image a complete A4 page at 300 dots per inch, the minimum that is conventionally believed necessary for reasonably high quality reproduction. Whilst larger CCDs are available in electronic cameras, they are much too expensive for a mass-market office imaging product.

A camera mounted over the desk and looking directly downwards could image documents on the desktop, avoiding this permanent waste of space. In order to obtain sufficient resolution with the limited number of available pixels, the camera would need to be directly above the document to be imaged, so that all of the document was in best focus. This, however, is inconvenient, requiring either that a user lean directly over the document or that a frame is provided over the desk on which the camera would be mounted. An overhead camera could obstruct a user's headroom or be inadvertently knocked.

Alternatively, if the camera were not directly above the document but, say, held or mounted at near an edge of the desktop, then not all of the document would be in focus simultaneously because the document would not be at right angles to the optical axis of the camera. Owing to the loss of resolution due to the camera's limited depth of field, only a part of the document would be captured with sufficient resolution in one frame. This is inconvenient, because a user or some type of mechanical actuator would then have to manually pan and tilt the camera to take a number of overlapping pictures, each with a magnification high enough to obtain sufficient resolution, and subsequently "stitch" these pictures together using software.

There is also the additional problem that the image would be distorted owing to the oblique viewing angle, an effect, referred to herein as "keystone distortion". Although such perspective distortion can readily be rectified using well-known image processing techniques, this does result in non-optimal resolution over the portions of the image where a printed character is spread over fewer pixels.

Conventional approaches to addressing these problems suffer from other limitations. Greater depth of field can be provided by reducing the camera aperture but this lowers the amount of light at the image plane, which raises noise levels. A greater exposure time will not work with hand-held photography, owing to camera shake. Active or electronic image stabilizers add to cost, and are not fully effective at eliminating the effect of camera shake. A frame and mechanical mounting to hold and pan/tilt the camera can eliminate camera shake, but with a significant penalty in terms of mechanical complexity and cost. Even with a small aperture, or longer shutter time, it is difficult to obtain the necessary depth of field to operate down to an angle of less than 45 degrees, as may be desirable with an electronic camera held or mounted at the edge of a desktop.

For many years, photographers have understood that under certain circumstances as defined by the Scheimpflug condition, it is possible simultaneously to focus on several things at different distances from the camera, providing that all the objects of interest lie on a flat plane. When the Scheimpflug condition is satisfied, the object plane, image plane, and a plane passing through the lens, all intersect along a line. Whilst this condition is necessary for correct focus, it is not, on its own, sufficient. Setting up a camera to focus on a tilted object plane has up to now been regarded as requiring a tripod mounted large format view camera and the skill of a professional photographer.

Professional photographers using such large format cameras can, with practice and an intuitive understanding of three dimensional geometry, achieve the Scheimpflug condition, and adjust the angle of the lens and/or the image plane in order to focus on a scene that has an area of interest in a plane at an oblique angle to the optical axis. Conventionally, this is done by viewing the image projected on a ground glass screen in the camera, whilst adjusting the relative orientation of the lens and image plane to focus on the object plane of interest.

Although this principle has been known for many years, Scheimpflug cameras have remained manually operated and large format. One attempt to partially automate a Scheimpflug camera is described in patent document U.S. Pat. No. 4,564,277. This however, describes a camera suitable for professional film photography and which may have a ground glass screen for viewing an image. The process is only semi-automated, requiring a photographer to move an image plane perpendicular to the optical axis to at least two locations where different areas of the screen are in focus, and enter (x,y,z) position data for these locations into a calculator, which from the known focal length of the lens, can then calculate the correct orientation of the lens or image plane to meet the Scheimpflug condition. Such a camera and process are not sufficiently inexpensive, quick or convenient for a mass-market desktop imaging product.

It is an object of the present invention to provide an electronic camera that addresses these problems.

BRIEF DESCRIPTION OF THE INVENTION

Accordingly, the invention provides an electronic, camera, comprising: a detector array; an objective lens arranged to direct optical radiation from an object plane onto the detector, the lens defining an optical axis of the camera, and the object plane being at an oblique angle to the optical axis; movement means to change the relative orientation of the detector with respect to the lens so that the detector and lens may be moved relatively toward or away from each other along the optical axis and also tilted with respect to each other with at least one degree of freedom; and focus detection means connected to the detector to detect when a portion of an image falling on the detector is in focus, characterized in that the camera includes a processor means to control the movement means according to the detected focus, the processor means bringing the image into focus on the detector by first changing the relative orientation of the lens and detector until a first portion of the image is in focus, and then holding said first portion in focus whilst continuing to change the relative orientation of the lens and detector until a second portion of the image is also in focus.

The term "lens" as used herein is not restricted to a single lens element and includes lenses with compound optical elements.

The focus detection means may be any of the known automatic focusing techniques that are found in digital or film-based still or video cameras. These include range finding techniques based on the transmission and reception of reflected infrared pulses. Additional focus means may also be employed, for example those relying on reflected ultrasonic pulses. Other known techniques that involve some sort of statistical or frequency domain analysis of the detected image, are particularly appropriate when the object is imaged electronically, rather than with photographic film, as with video or digital still cameras.

Acoustic and, particularly, infrared range finders are very directional. It would be possible to fit three of these to the camera pointing in different directions within the field of view. The position of a plane is defined by the position of three non-collinear points. Knowing the position of the object plane, the required angle of the image (or lens) plane could then be calculated directly by 3-D geometry. With the simplification discussed above only two range finders would be needed.

The detector may be any type of electronic detector, in particular a two-dimensional CCD array or CMOS array.

Assuming a reasonably designed lens, whatever the position of the image or lens planes, the image is a perspective projection of the original object. Thus, any straight line on the object plane is also a straight line on the image plane. A consequence of this is that it is unnecessary to go through the procedure described in U.S. Pat. No. 4,564,277 to determine the position of the image plane and then, from this and a knowledge of the focal length, calculating the required positions of the lens and/or image planes using Scheimpflug's rule. It is sufficient to adjust the focus directly. No calculation of the position of any of the planes is required. Neither is it necessary to know the focal length of the lens.

Preferably, the processor means brings the image into focus by first moving the lens and detector relatively towards or away from each other along the optical axis until the first portion of the detector is in focus, and then holding said first portion in focus whilst tilting with respect to each other the lens and detector until the second portion is also in focus.

When the image of an object in an object plane oblique to the optical axis comes into focus on the detector, the object, lens and detector satisfy the Scheimpflug condition. The lens may become mechanically complicated if it has to be correctly positioned both for a general or rough focus by moving in and out with respect to a camera body, as well as having to be tilted. Although it is possible to move the plane of the lens through a number of positions meeting the Scheimpflug condition until the position of best focus is found, it is preferred to leave the lens in a fixed position and move the detector to the image plane in order to meet the same condition, because this may be mechanically simpler and lends itself to be performed automatically.

Therefore the lens may be movable along the optical axis with respect to the camera body, with the detector being movable with respect to the body at least to tilt the detector with respect to the lens. Optionally, some small amount of general focus may be provided for by the detector by movement of the detector along the optical axis without tilting.

Alternatively, and particularly in the case where the operating focus distance is always within well-defined limits, say of the order of 0.2 m to 2 m in a desktop imaging application, the lens may be fixed relative to the body, with the detector being movable with respect to the body along the optical axis and to tilt the detector with respect to the lens.

In either case, the detector array will then be physically moved by the movement means, for example being mounted at corners on linear actuators that allow the detector to move backwards and forwards and also tilt with respect to the optical axis. If the camera is to be used in an application where essentially only one degree of tilt freedom is needed, for example if a document to be imaged will always be directly in front of the camera on a surface tilted relative to the optical axis about a line at right angles to this axis, then it need have only one degree of tilt freedom. A consequence of this simplification of camera motion is that there is a corresponding simplification in focusing motion, requiring only two degrees of freedom: linear movement and tilt in one direction. This results in simplification of processor control as well.

However, in most cases, it is envisaged that the camera may have to cope with an object tilted about a line not at right angles to the optical axis. Therefore, the detector and lens may be arranged so that these can be tilted relative to each other with two essentially orthogonal degrees of freedom. The processor means then brings the image into focus by first bringing the first and second portions into focus, and then holding said first and second portions in focus whilst tilting with respect to each other the lens and detector until a third portion of the image is also in focus.

In a second embodiment of the invention, an electronic camera comprises additionally: a second lens disposed between the objective lens and the detector and arranged to direct optical radiation from an image plane of the objective lens onto the detector, the second lens defining an internal optical axis of the camera that intersects the optical axis of the objective lens; and a rotation means to change the relative orientation of the second optical axis and the optical axis of the objective lens, the processor means being adapted to control the rotation means in order to improve detector keystone distortion in the image plane of the second lens.

The above term "improve" means in this context either ameliorating or eliminating keystone distortion.

Surprisingly, it is in principle possible to eliminate keystone distortion whilst at the same time bringing the image of the tilted object into focus on the detector by satisfying a double Scheimpflug condition, one for each lens. In addition, this can be done automatically by the processor means, using the focus detection in the detector portions mentioned above, and knowledge of the focal length of the both lenses, and the separation between these lenses.

Specifically, the camera may comprise comprises memory means holding data representative of: the focal length of both the objective and second lenses, and the separation of the lenses when the axes of the lenses are aligned. The camera then comprises means to determine the relative orientation of the detector and the second lens when the portions of the image are in focus and to generate data representative of said orientation. Finally, the processor means can be arranged to calculate from said focal length, separation and orientation data a relative orientation of the objective lens, second lens and detector that will focus the object plane onto the detector whilst at the same time improving keystone distortion.

In the case where the object plane is tilted about a line at right angles to the objective optical axis, the rotation means may need only one degree of freedom. In general, however, the second optical axis may be rotated with respect to the first optical axis with two essentially orthogonal degrees of freedom.

The electronic camera described above may be used in a desktop imaging application, in place of a flatbed scanner. Such an imaging device may have a mount, for example a pole or bracket clampable to an edge of a desk, by which the camera may be mounted above the edge of the desk and directed down onto the desk in order to image a document on the desk.

A desktop imaging device positioned above and to one side of a work surface on a desk naturally takes advantage of the Scheimpflug condition because the desktop is inherently a flat plane.

Also according to the invention, there is provided a method of imaging an object, using an electronic camera comprising a detector array, an objective lens arranged to direct optical radiation from an object plane onto the detector, the lens defining an optical axis of the camera, movement means to change the relative orientation of the detector with respect to the lens so that these may be moved relatively toward or away from each other along the optical axis and also tilted with respect to each other with at least one degree of freedom, and focus detection means connected to the detector to detect when a portion of an image falling on the detector is in focus, the method comprising the first step of pointing the camera at the object so that the object plane is at an oblique angle to the optical axis, characterized in that the camera includes a processor means to control the movement means according to the detected focus, and in that the method comprises the additional steps of:

i) using the processor means to bring the image into focus on the detector by first changing the relative orientation of the lens and detector until a first portion of the image is in focus; and then ii) holding said first portion in focus whilst continuing to change the relative orientation of the lens and detector until a second portion of the image is also in focus.

The method may also be adapted to the case where it is desired to improve keystone distortion in an electronic camera having a second lens, as mentioned above. Therefore, when the processor means is adapted to control the rotation means, the method comprises the step of:

iii) using the processor means to change the relative rotation of the second optical axis and the optical axis of the objective lens in order to improve detector keystone distortion in the image plane of the second lens.

When the camera comprises memory means, and means to determine the relative orientation of the detector as mentioned above, the method comprises the step of:

iv) storing in the memory means data representative of: the focal length of both the objective and second lenses, and the separation of the lenses when the axes of the lenses are aligned;

and after step ii) the steps of:

v) using the processor means to calculate from said focal length, separation and orientation data a desired relative orientation of the objective lens, second lens and detector; and vi) using the processor means to change the relative orientation of the objective lens, second lens and detector in order to focus the object plane onto the detector whilst at the same time improving keystone distortion.

The invention will now be further described, by way of example, with reference to the accompanying drawings, in which:

DETAILED DESCRIPTION OF THE INVENTION

Figure 1:
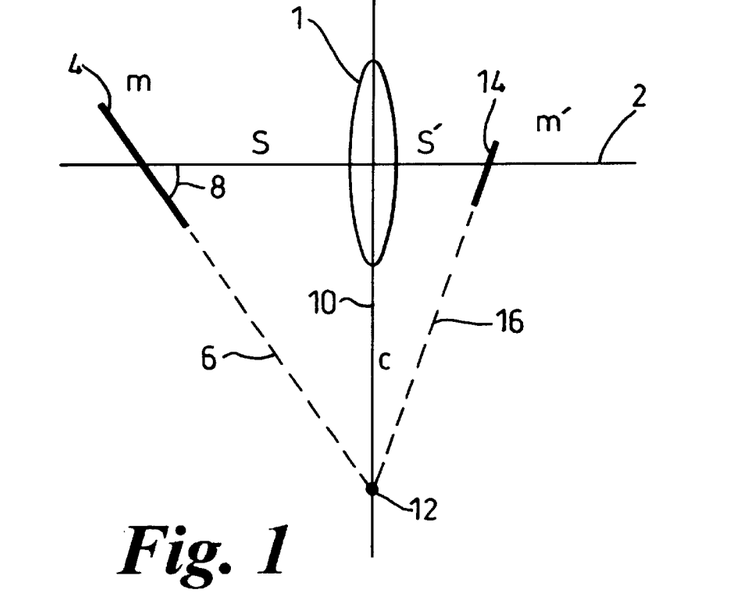
FIG. 1 is a schematic drawing of a lens with an object plane and an image plane satisfying the Scheimpflug condition.

FIG. 1 shows schematically the Scheimpflug condition, in which a lens 1 has an optical axis 2, and a planar object 4 is in an object plane 6 lying oh the axis 2 tiled at an acute angle 8. The object 4 is separated from the lens 2 by a distance S greater than a focal distance f of the lens. A lens plane 10 perpendicular to the optical axis 2, intersects object plane 6 along a line represented by point 12 in the drawing. An inverted planar image 14 of the object 4 will then form on the optical axis 2 and lie in an image plane 16 that is separated by a distance S' from the lens. The image plane 16 intersects the object plane 6 and perpendicular plane 10 along the same line at point 12.

In FIG. 1, m is the slope of the object plane 6 and m' the slope of the image plane 16. The normal lateral magnification of this system is therefore $-S'/S$. When the object plane 6 and image plane 16 satisfy the Scheimpflug condition, then the object plane and image plane must intersect on the lens plane 10. If the distance between the point of intersection 12 and the optical axis 2 is c, then:

$$m=-c/S \text{ and } m'=c/S' \text{ so } m'=-m\cdot S/S'.$$

For a typical lateral magnification of $-1/15$, $m'=-15$ m.

Figure 2:
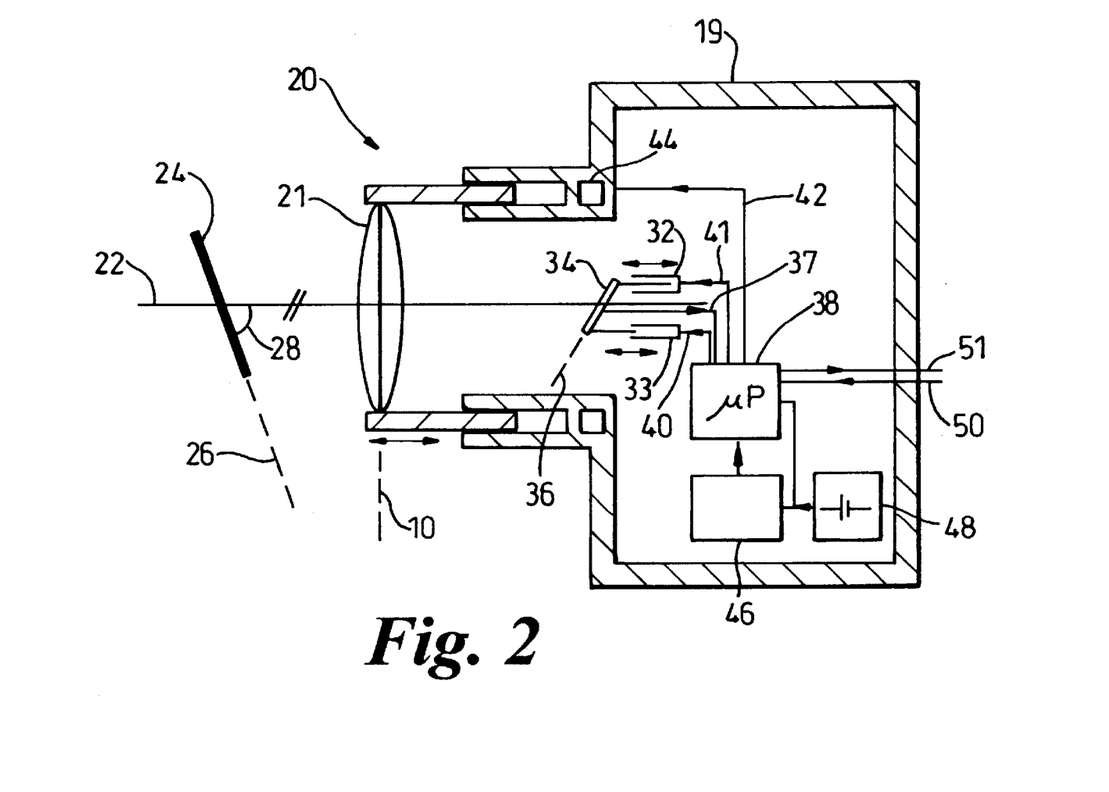
FIG. 2 is a schematic drawing of an electronic camera according to a first embodiment of the invention, with microprocessor driven focus and detector tilt actuators to achieve the Scheimpflug condition.

Reference now is made also to FIG. 2. This shows schematically an electronic camera 20, having a body 19 in which a lens 21 images an object 24, lying on an object plane 26 at an acute angle 28 on optical axis 22, onto a two dimensional CCD detector array 34 lying on an image plane 36. The detector array 34 is square and, although not shown in detail, two actuators 32,33 are mounted to move diametrically opposite corners of the detector 34 which then pivots under the action of the actuators about an intermediate corner so that the actuators provide two independent orthogonal degrees of freedom in tilting the detector 34 relative to the lens 21.

When the object plane 26 is 20° away from vertical then its slope is −tan(70)=−2.74. With a lateral magnification of −1/15 the slope of the image plane 36 will be 41.21 which is only 1.39 degrees away from the vertical. For a typical CCD sensor 10 mm on a side rotated about its centre this represents a displacement of only 5·sin(1.39)=0.12 mm at a corner of the detector 34.

This is a relatively small displacement, which can be provided for with correspondingly compact actuators 32,33. The invention therefore benefits from the fact that electronic detectors are small, certainly compared with large format photographic film.

The detector 34 provides an output 37 to a microprocessor 38 for the image captured by the detector. The microprocessor 38 is also has output lines 40,41,42 used to drive the detector actuators 32,33 and a lens focus actuator 44.

In general, a memory 46 may be connected to the microprocessor 38, and the camera 20 will have a sufficiently low average power consumption, that it may be battery powered from a removable or rechargeable battery 48. Digital input/output lines 50,51 allow the camera to be interfaced with a personal computer (not shown).

Focusing may be detected with the aid of the microprocessor 38. The actuators 32,33 can be controlled by a derivative of one of the known automatic focus methods, preferably one of the image statistical or frequency domain techniques. There are various focus arrangements that are suitable. For example, one existing method achieves sharpest focus by adjusting to maximize the variance of the pixels read from the detector 34. Optionally, by providing three actuators behind the CCD assembly, one in the centre in addition to the two 32,33 on adjacent edges or opposite corners, it is possible to provide full control of the position of the image plane, so that at least some of the total focus capability may be provided by the detector 34. The image variance may be measured separately in two or three regions, depending on the number of degrees of freedom of the detector movement; the position of the central actuator being regulated by the focus of the central region and the two sides by corresponding regions along the two edges. Incorporating each of these corrections into a closed loop control system including the microprocessor 38 results in Scheimpflug condition autofocus.

Figure 3:
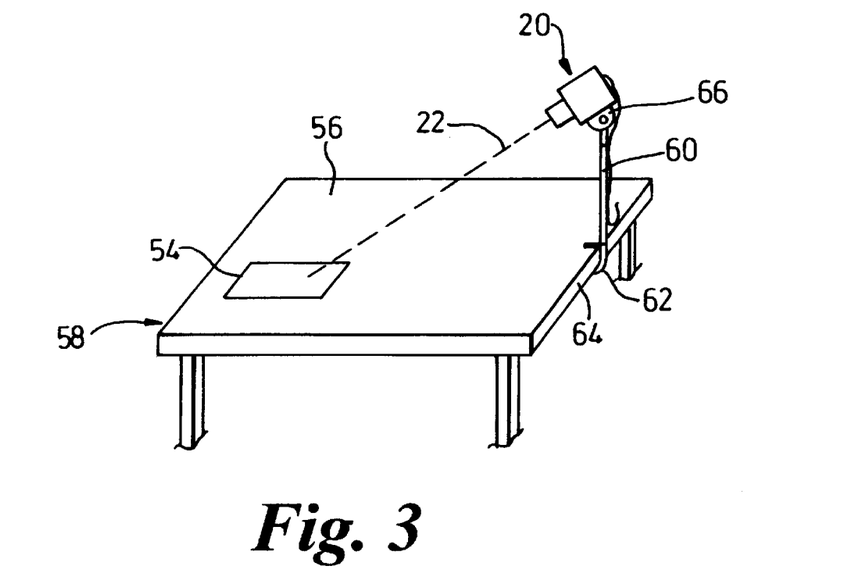
FIG. 3 is a schematic view of a desktop imaging device using the electronic camera of FIG. 2 to image an A4 size sheet of paper on a desk.

FIG. 3 shows how the electronic camera 20 may be used to capture an image of a piece of A4 size paper 54 resting on the surface 56 of a desk 58. The camera 20 is mounted atop a post 60 that is clamped 62 to an edge 64 of the desk 58. A mount 66 pivotable about a horizontal and a vertical axis connects the post 60 to the camera 20, so that the camera can be pointed manually to any part of the desk surface 56. Because the camera 20 is at the edge of the desk 58, the rest of the desk surface 56 is free as a work surface or for the placement of other office equipment such as a printer or a personal computer.

Figure 4:
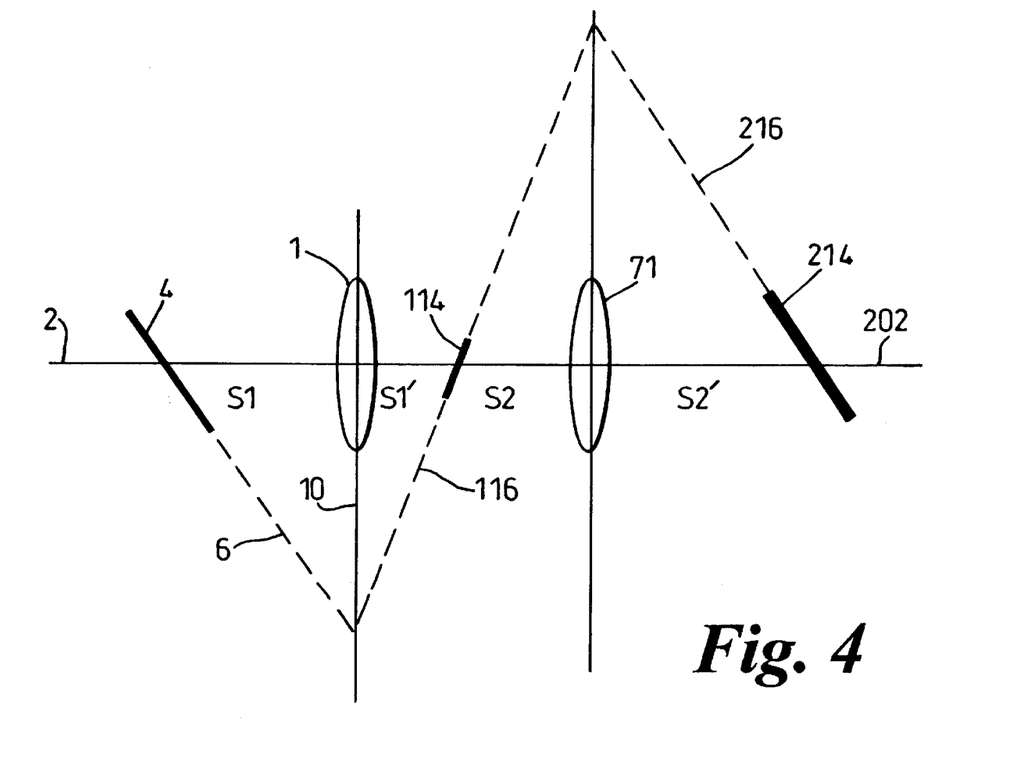
FIG. 4 is a schematic drawing showing two lenses with an object plane, an intermediate image plane, and a final image plane satisfying a double Scheimpflug condition.
Figure 5:
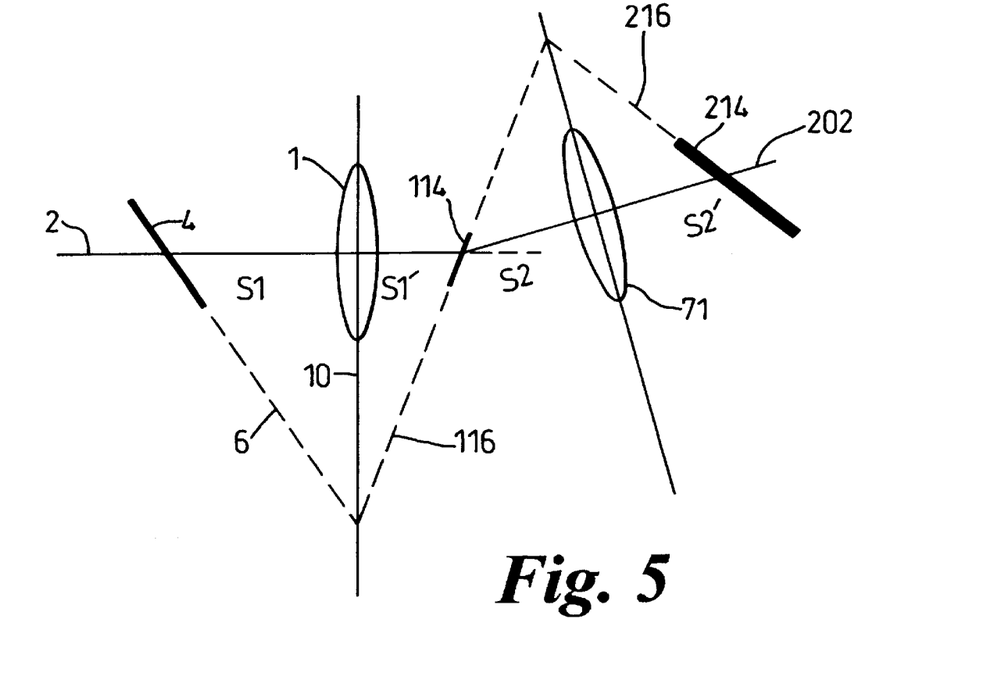
FIG. 5 is a schematic drawing showing the same lenses of FIG. 4 satisfying another double Scheimpflug condition consistent with a second embodiment in which keystone distortion is removed from the final image plane.
Figure 6:
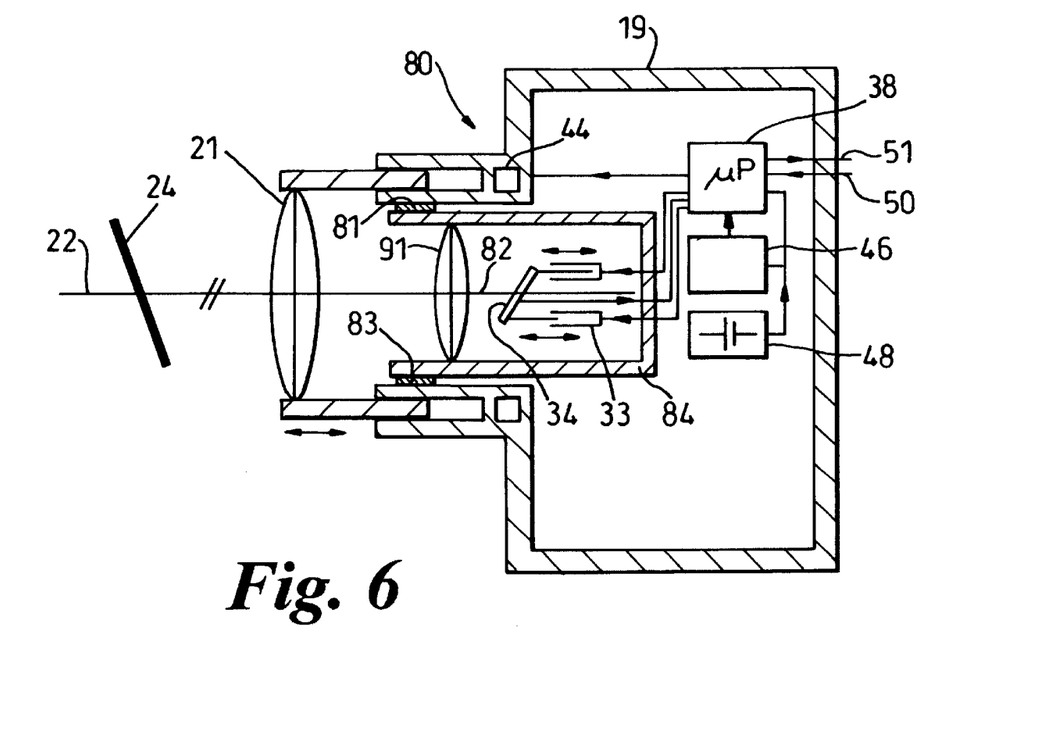
FIG. 6 is a schematic drawing of an electronic camera according to a second embodiment of the invention, that may achieve the double Scheimpflug condition of FIG. 5 in which keystone distortion may be removed whilst at the same time achieving focus of a tilted object plane across a detector.

Reference is now made to FIG. 4 and a second embodiment of the invention illustrated in FIGS. 5 and 6.

As is known, when the object and image plane for a single lens meet the Scheimpflug condition the image is in sharp focus. However the image is distorted owing to the oblique viewing angle of the object. To remove this keystone distortion a second lens 71 is added to the arrangement described above. Initially, the optical axis 2 of the objective lens 1 is coaxial with the optical axis 202 of the second lens 71. This makes the image plane 16 and image 14 described above respectively an intermediate image plane 116 and intermediate image 114. The detector 214 can then be placed in an ultimate image plane 216. Again, the detector 216 can be moved to satisfy the Scheimpflug condition, as shown in FIG. 4.

The image on detector 216 will still suffer from keystone distortion, but FIG. 5 shows how this distortion can be eliminated by rotating together the second lens 71 and detector 216 about an axis at right angles to and through the objective lens axis, and through the intermediate image plane 114.

The following description explains mathematically how this can be accomplished.

Definition of Terms f1: Focal length of objective lens 1
f2: Focal length of second lens 71
S1: Object distance from objective lens 1
M1: Magnification of lens 1: M=f1/(f1+S1)
S2: Distance of image formed by lens 1 from lens 71
M2: Magnification of lens 71: M2=f2/(f2+S2)
K: Angle of inclination of object with respect to optical axis of lens 1
P: Angle between optical axes 2, 202 of lenses
Q: tilt of detector 214 relative to optical axis 2, 202
R: Angle of inclination of the intermediate image 114

$$R = \mathrm{ArcTan}\{-M1 \cdot \mathrm{Tan}(K)\} \quad (1)$$

Focus and zero keystone distortion is achieved when:

$$\mathrm{ArcCos}\{f2 \cdot \mathrm{Cos}[R]/(f1 \cdot M1 \cdot M2)\} + R - 180 \quad (2)$$

Rotating the axis by the angle given by formula (2) above and then rotating the sensor to satisfy the Scheimpflug condition gives an image that has no keystone distortion and is in sharp focus.

For example, consider an object with:
S1=400 mm from lens 1 and angled at 70° (K)
f1=f2=12.12 mm
M1=−1/32
M2=−2

Formula (1) above gives R=90.65°, and so from formula (2), P=11.14°.

A method for achieving the double Scheimpflug focus condition with no keystone distortion is as follows.

First, the optical axes 2, 202 of the two single Scheimpflug stages are aligned, as in FIG. 4. Then the detector is moved in the same way as for a single Scheimpflug stage to get the object into sharp focus. Assuming that the orientation of the second lens and detector can be measured or determined, this then gives the distance S2', and the tilt of the detector 214 relative to the optical axis 2, 202. Since we know the focal length of the second lens 71, we can use the lens equation to calculate S2=S2'·f2/(f2−S2').

From the lens equation, M2=f2/(f2+S2).

Using the magnifications we can work back from the tilt of the sensor to work out the tilt of the intermediate image using the inverse of the single stage Scheimpflug formula (1) to get:

$$R = \mathrm{ArcTan}\{(-1/M2)\mathrm{Tan}(Q)\} \quad (3)$$

This data is substituted into formula (2) to find the correct alignment for the second stage with respect to the first. All these calculation steps can, of course, be performed by a microprocessor, which will also be controlling the motion of actuators.

FIG. 6 shows schematically how in a second embodiment of the invention a double Scheimpflug electronic camera 80 may work. Features common with those of the first embodiment illustrated in FIG. 2 for convenience share the same reference numerals. The second embodiment 80 differs from the first embodiment mainly in the provision of a second lens 91 mounted inside the camera body 19 on pivots 81,83 that define a single axis of rotation of the second lens 91. The second lens 91 is held in a tube 84 that also holds the detector 34, so that both the second lens 91 and detector 34 pivot in unison. The arrangement allows keystone distortion in one direction to be cancelled. If keystone distortion in different directions is needed, then a two-axis gimbal mount could replace the simple pivots 81,83.

The microprocessor and actuator arrangement of FIG. 6 differs from that described for the first embodiment of the invention in FIG. 2, in that the microprocessor keeps track of the degree of displacement of the objective lens 21, and the angular orientation of the tube 84 and tilt of the detector 84.

The practical arrangement inside the tube 84 can be thought of as a single lens planar Scheimpflug focus unit as previously described consisting of lens and moving detector 34. This unit 84 can be rotated about a point corresponding to the intermediate image between the lenses 21,91.

The invention has been described herein as being applicable to overhead scanning or documents. However, there is no reason why the invention should not be applied to hand-held cameras. The invention is not limited to capturing images on perfectly flat planes either. In any case where there is a dominant plane present the invention could provide advantages to the user. For example, many landscapes require great depth of field but the foreground, in particular, may be fairly flat. Thus the main plane will be roughly horizontal. Similarly, pictures of buildings may have a vertical main plane. By making more than the minimum three focus measurements it would be possible automatically to determine if there was an appropriate object plane and, if so, focus on it or, if not, focus according to some default procedure. As mentioned above, professional photographers using expensive equipment are able to exploit these possibilities today with large format tripod mounted cameras and the exercise of their skill. By removing the element of skill the invention may permit any photographer using a digital camera to do the same.

What is claimed is:

1. An electronic camera, comprising: a detector array; an objective lens arranged to direct optical radiation from an object plane onto the detector, the lens defining an optical axis of the camera and the object plane being at an oblique angle to the optical axis; movement apparatus to change the relative orientation of the detector with respect to the lens so that the detector and lens may be moved relatively toward or away from each other along the optical axis and also tilted with respect to each other with at least one degree of freedom; and a focus detection apparatus connected to the detector to detect when a portion of an image falling on the detector is in focus, wherein the camera includes a processor to control the movement apparatus according to the detected focus, the processor bringing the image into focus on the detector by first changing the relative orientation of the lens and detector until a first portion of the image is in focus, and then holding said first portion in focus whilst continuing to change the relative orientation of the lens and detector until a second portion of the image is also in focus.

2. An electronic camera as claimed in claim 1, in which the processor brings the image into focus by first moving the lens and detector relatively towards or away from each other along the optical axis until the first portion of the image is in focus, and then holding said first portion in focus whilst tilting with respect to each other the lens and detector until the second portion is also in focus.

3. An electronic camera as claimed in claim 2, in which the detector and lens can be tilted relative to each other with two essentially orthogonal degrees of freedom, the processor bringing the image into focus by first bringing the first and second portions into focus, and then holding said first and second portions in focus whilst tilting with respect to each other the lens and detector until a third portion of the image is also in focus.

4. An electronic camera as claimed in claim 1, in which the camera has a body, the lens being movable along the optical axis with respect to the body, and the detector being movable with respect to the body at least to tilt the detector with respect to the lens.

5. An electronic camera as claimed in claim 1, in which the lens is fixed relative to the body, and the detector is movable with respect to the body along the optical axis and to tilt the detector with respect to the lens.

6. An electronic camera as claimed in claim 1, in which the camera comprises: a second lens disposed between the objective lens and the detector and arranged to direct optical radiation from an image plane of the objective lens onto the detector, the second lens defining an internal optical axis of the camera that intersects the optical axis of the objective lens; and a rotation apparatus to change the relative orientation of the second optical axis and the optical axis of the objective lens, the processor being adapted to control the rotation apparatus in order to improve detector keystone distortion in the image plane of the second lens.

7. An electronic camera as claimed in claim 6, in which the camera comprises a memory holding data representative of: the focal length of both the objective and second lenses, and the separation of the lenses when the optical axes of the lenses are aligned, wherein the camera comprises an orientation detection apparatus to determine the relative orientation of the detector and the second lens when the portions of the image are in focus and to generate data representative of said orientation, the processor being arranged to calculate from said focal length, separation and orientation data a relative orientation of the objective lens, second lens and detector that will focus the object plane onto the detector whilst at the same time improving keystone distortion.

8. An electronic camera as claimed in claim 6, in which the second optical axis can be rotated with respect to the first optical axis with two essentially orthogonal degrees of freedom.

9. A desktop imaging device, comprising an electronic camera and a mount by which the camera may be mounted above an edge of a desk and directed down onto the desk in order to image a document on the desk, in which the camera has the following features:

a detector array; an objective lens arranged to direct optical radiation from an object plane onto the detector, the lens defining an optical axis of the camera and the object plane being at an oblique angle to the optical axis; movement apparatus to change the relative orientation of the detector with respect to the lens so that the detector and lens may be moved relatively toward or away from each other along the optical axis and also tilted with respect to each other with at least one degree of freedom; a focus detection apparatus connected to the detector to detect when a portion of an image falling on the detector is in focus; and a processor to control the movement apparatus according to the detected focus, the processor bringing the image into focus on the detector by first changing the relative orientation of the lens and detector until a first portion of the image is in focus, and then holding said first portion in focus whilst continuing to change the relative orientation of the lens and detector until a second portion of the image is also in focus.

10. A desktop imaging device as claimed in claim 9, wherein the camera is adapted such that the processor brings the image into focus by first moving the lens and detector relatively towards or away from each other along the optical axis until the first portion of the image is in focus, and then holding said first portion in focus whilst tilting with respect to each other the lens and detector until the second portion is also in focus.

11. A desktop imaging device as claimed in claim 10, in which the detector and lens can be tilted relative to each other with two essentially orthogonal degrees of freedom, the processor bringing the image into focus by first bringing the first and second portions into focus, and then holding said first and second portions in focus whilst tilting with respect to each other the lens and detector until a third portion of the image is also in focus.

12. A desktop imaging device as claimed in claim 9, in which the camera comprises: a second lens disposed between the objective lens and the detector and arranged to direct optical radiation from an image plane of the objective lens onto the detector, the second lens defining an internal optical axis of the camera that intersects the optical axis of the objective lens; and a rotation apparatus to change the relative orientation of the second optical axis and the optical axis of the objective lens, the processor being adapted to control the rotation apparatus in order to improve detector keystone distortion in the image plane of the second lens.

13. A desktop imaging device as claimed in claim 12, in which the camera comprises a memory holding data representative of: the focal length of both the objective and second lenses, and the separation of the lenses when the optical axes of the lenses are aligned, wherein the camera comprises an orientation detection apparatus to determine the relative orientation of the detector and the second lens when the portions of the image are in focus and to generate data representative of said orientation, the processor being arranged to calculate from said focal length, separation and orientation data a relative orientation of the objective lens, second lens and detector that will focus the object plane onto the detector whilst at the same time improving keystone distortion.

14. A method of imaging an object, using an electronic camera comprising a detector array, an objective lens arranged to direct optical radiation from an object plane onto the detector, the lens defining an optical axis of the camera, movement apparatus to change the relative orientation of the detector with respect to the lens so that these may be moved relatively toward or away from each other along the optical axis and also tilted with respect to each other with at least one degree of freedom, and a focus detection apparatus connected to the detector to detect when a portion of an image falling on the detector is in focus, the method comprising the first step of pointing the camera at the object so that the object plane is at an oblique angle to the optical axis, wherein the camera includes a processor to control the movement apparatus according to the detected focus, and in that the method comprises the additional steps of:

i) using the processor to bring the image into focus on the detector by first changing the relative orientation of the lens and detector until a first portion of the image is in focus; and then ii) holding said first portion in focus whilst continuing to change the relative orientation of the lens and detector until a second portion of the image is also in focus.

15. A method of imaging an object as claimed in claim 14, in which the camera comprises: a second lens disposed between the objective lens and the detector and arranged to direct optical radiation from an image plane of the objective lens onto the detector, the second lens defining an internal optical axis of the camera that intersects the optical axis of the objective lens; and a rotation apparatus to change the relative orientation of the second optical axis and the optical axis of the objective lens, the processor being adapted to control the rotation apparatus, wherein the method comprises the step of:

iii) using the processor to change the relative rotation of the second optical axis and the optical axis of the objective lens in order to improve detector keystone distortion in the image plane of the second lens.

16. A method as claimed in claim 15, in which the camera comprises a memory, and an orientation detection apparatus to determine the relative orientation of the detector and the second lens when the portions of the image are in focus and to generate data representative of said orientation, the method further including of:

iv) storing in the memory data representative of: the focal length of both the objective and second lenses, and the separation of the lenses when the axes of the lenses are aligned;

and after step ii) the steps of:

v) using the processor means to calculate from said focal length, separation and orientation data a desired relative orientation of the objective lens, second lens and detector; and vi) using the processor to change the relative orientation of the objective lens, second lens and detector in order to focus the object plane onto the detector whilst at the same time improving keystone distortion.

* * * * *

UNITED STATES PATENT AND TRADEMARK OFFICE
CERTIFICATE OF CORRECTION

PATENT NO. : 6,567,126 B1
DATED : May 20, 2003
INVENTOR(S) : David Neil Slatter et al.

It is certified that error appears in the above-identified patent and that said Letters Patent is hereby corrected as shown below:

Column 12,
Line 38, change "further including of" to -- further including --.

Signed and Sealed this

Twentieth Day of September, 2005

JON W. DUDAS
*Director of the United States Patent and Trademark Office*